(12) United States Patent
Breedvelt-Schouten et al.

(10) Patent No.: US 11,222,429 B2
(45) Date of Patent: Jan. 11, 2022

(54) OBJECT MOVEMENT INDICATION IN A VIDEO

(71) Applicant: INTERNATIONAL BUSINESS MACHINES CORPORATION, Armonk, NY (US)

(72) Inventors: Ilse M. Breedvelt-Schouten, Manotick (CA); John A. Lyons, Ottawa (CA); Jeffrey A. Kusnitz, Campbell, CA (US); Jana H. Jenkins, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 114 days.

(21) Appl. No.: 16/736,438

(22) Filed: Jan. 7, 2020

(65) Prior Publication Data
US 2021/0209768 A1 Jul. 8, 2021

(51) Int. Cl.
*G06K 9/00* (2006.01)
*G06T 7/246* (2017.01)

(52) U.S. Cl.
CPC .......... *G06T 7/246* (2017.01); *G06K 9/00744* (2013.01); *G06K 2009/00738* (2013.01); *G06T 2207/10016* (2013.01)

(58) Field of Classification Search
CPC .......... G06T 7/246; G06T 2207/10016; G06K 9/00744; G06K 2009/00738
See application file for complete search history.

(56) References Cited

U.S. PATENT DOCUMENTS

| 8,818,175 B2 | 8/2014 | Dubin et al. |
| 9,207,811 B2 | 12/2015 | Hou et al. |
| 10,186,043 B2 * | 1/2019 | Lin .......................... G06T 7/246 |
| 2002/0107078 A1 * | 8/2002 | Collins ................ A63B 43/008 473/152 |
| 2006/0008116 A1 * | 1/2006 | Kiraly ....................... G06T 7/20 382/103 |

(Continued)

OTHER PUBLICATIONS

Royden et al., "Use of speed cues in the detection of moving objects by moving observers," Vision Research, tyr. 15, 2012, vol. 59, pp. 17-24 (Year: 2012).*

(Continued)

*Primary Examiner* — Amara Abdi
(74) *Attorney, Agent, or Firm* — Cuenot, Forsythe & Kim, LLC

(57) ABSTRACT

An object that moves, which is depicted in a video, can be identified. Radial lines emanating from the object can be rendered in an enhanced video. Responsive to detecting a first movement of the object indicating a size of the object is increasing in the video, a length of each of the radial lines can be increased. Responsive to detecting a second movement of the object indicating the size of the object is decreasing in the video, the length of each of the radial lines can be decreased. Responsive to detecting a third movement of the object, in a two-dimensional plane, the length of a first portion of the radial lines emanating from a leading surface of the object can be decreased while the length of a second portion of the radial lines emanating from a trailing surface of the object can be increased.

20 Claims, 9 Drawing Sheets

(56) References Cited

U.S. PATENT DOCUMENTS

| | | | |
|---|---|---|---|
| 2010/0182501 A1* | 7/2010 | Sato | G06F 16/739 348/441 |
| 2016/0365115 A1 | 12/2016 | Boliek et al. | |
| 2020/0005490 A1* | 1/2020 | Paik | G06K 9/00771 |

OTHER PUBLICATIONS

Yan, F. et al., "A novel data association algorithm for object tracking in clutter with application to tennis video analysis," In 2006 IEEE Computer Society Conference on Computer Vision and Pattern Recognition (CVPR'06), Jun. 17, 2006, vol. 1, pp. 634-641. IEEE.

Lemire, J., "Mizuno Introduces Smart Baseball With Internal Pitch-Tracking Tech," [online] SportTechie, Sep. 12, 2017, retrieved from the Internet: <https://www.sporttechie.com/mizuno-smart-baseball-internal-pitch-tracking-tech/>, 2 pg.

Routray, P., "Ball Tracking With Kinect," [online] YouTube, Feb. 8, 2016, retrieved from the Interent: <https://www.youtube.com/watch?v=3WXAi057Z50>. 56 Sec.

Kinexon GmbH, "Player and Ball Tracking," [online] YouTube, May 11, 2018, retrieved from the Internet <https://www.youtube.com/watch?v=JFVAy_uC0V4>, 1:58 min.

Chakraborty, B. et al., "A real-time trajectory-based ball detection-and-tracking framework for basketball video," J Opt 42, 156-170 (2013), Abstract.

Gordon, A., "How Fox's Reviled Glowing Puck Lit the Way for Sports Television Greatness," [online] SLATE Podcasts, © 2020 The Slate Group LLC, Jan. 28, 2014, retrieved from the Internet: <https://slate.com/culture/2014/01/foxtrax-glowing-puck-was-it-the-worst-blunder-in-tv-sports-history-or-was-it-just-ahead-of-its-time.html>, 4 pg.

"Hawk-Eye in Tennis," [online] © 2018 Hawk-Eye Innovations Ltd. [retrieved Jan. 6, 2020], retrieved from the Internet <https://www.hawkeyeinnovations.com/sports/tennis>, 2 pg.

Royden, C.S., et al., "Use of speed cues in the detection of moving objects by moving observers," Vision Research, Apr. 15, 2012, vol. 59, pp. 17-24.

"Optic Flow," [online] Department of Psychology, Royal Holloway, University of London [retrieved Jan. 6, 2020], retrieved from the Internet: <http://www.pc.rhul.ac.uk/sites/ARL/research/optic_flow.htm>, 1 pg.

Joarder, K et al., "A new method to calculate looming for autonomous obstacle avoidance," In IEEE Computer Society Conference on Computer Vision and Pattern Recognition, Jun. 1994, 33 pg.

Yan, J.J. et al., "Visual processing of the impending collision of a looming object: Time to collision revisited," Journal ol Vision, Oct. 1, 2011, vol. 11, No. 12, 46 pg.

"Visual Tracking of a Tennis Ball," [online] YouTube, Awesomo2001, Mar. 23, 2007, retrieved from the Internet <https://www.youtube.com/watch7v=iRlWw8GD0xc>, 1 pg.

"TrackingJS," [online] Trackingjs.com, retrieved Jan. 7, 2020, retrieved from the Internet: <https://trackingjs.com/examples/color_video.html>, 1 pg.

Lundgren, E. et al."Tracking.js Introduction," [online] Trackingjs.com, retrieved Jan. 7, 2020, Retrieved from the Internet: <https://trackingjs.com/docs.html#introduction>, 9 pg.

Moulson, P., "Motion Tracking of a Ball From Real-time Video Sequences," Doctoral Dissertation, University of Leeds, School of Computer Studies, 2002-2003, 58 pg.

\* cited by examiner

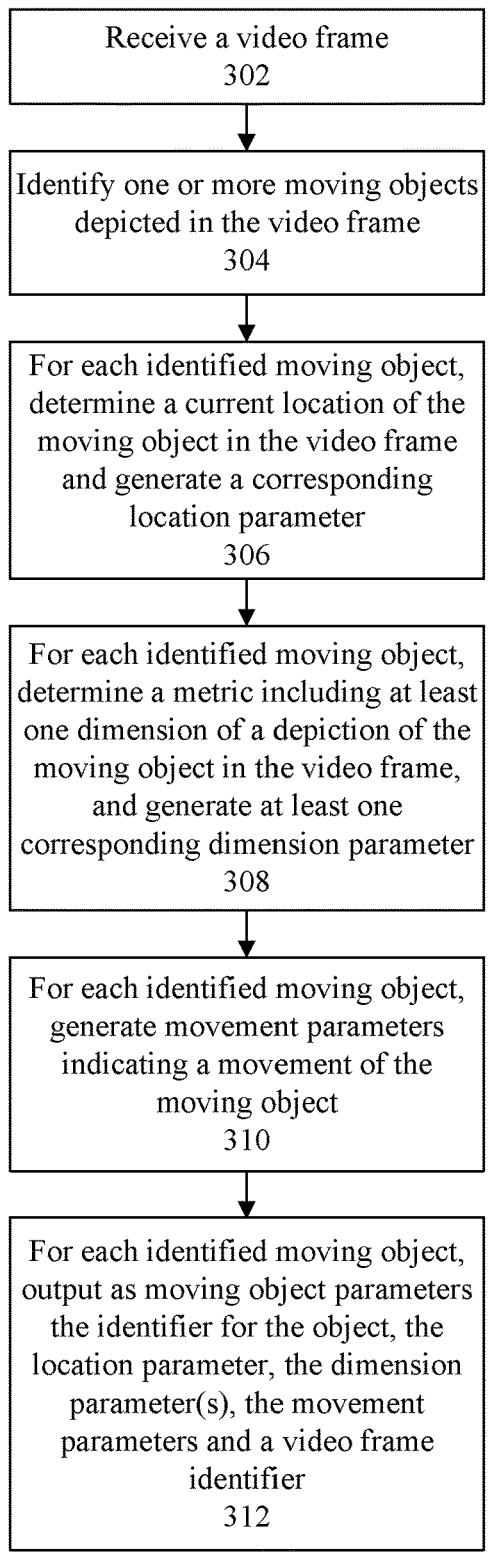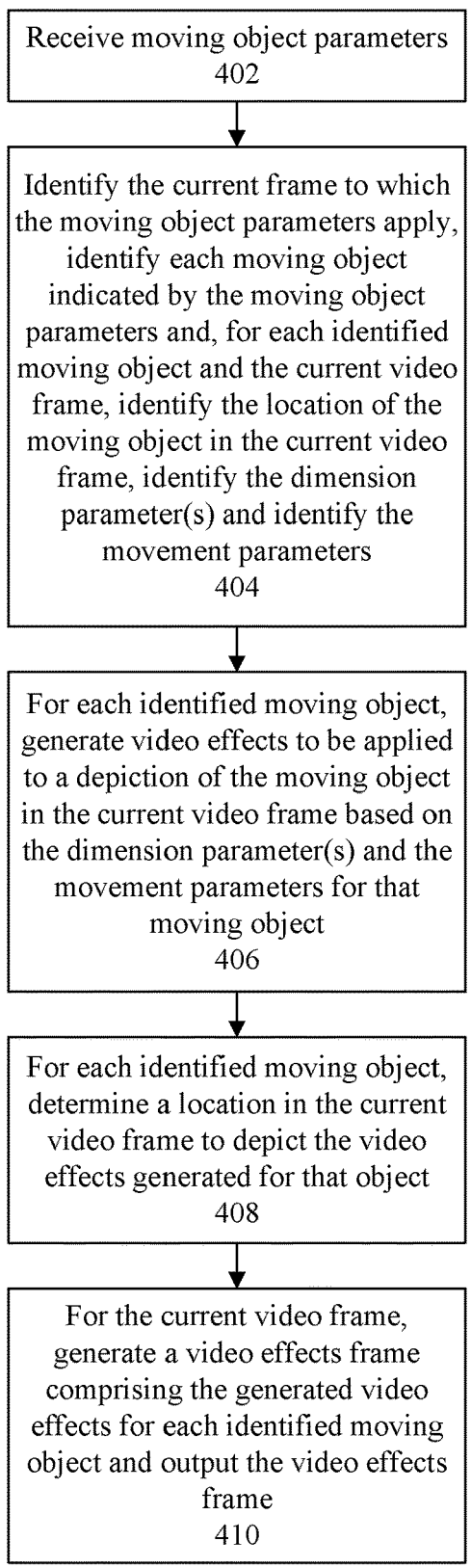
FIG. 3
FIG. 4

Video
150

Enhanced Video
165

Video
150

Enhanced Video
165

OBJECT MOVEMENT INDICATION IN A VIDEO

BACKGROUND

The present invention relates to video presentation, and more specifically, to presentation of a video that depicts a moving object.

Viewing of sporting events involving the use of moving objects, such as balls, vehicles, etc., is very popular. For example, video (e.g., televised broadcasts and Internet streaming) of soccer games, baseball games, football games, basketball games, automobile racing, etc., typically are viewed by large numbers of users. Most commonly the video is presented on two-dimensional displays, for example on televisions, computer displays, projection screens, etc.

SUMMARY

A method includes identifying, using a processor, in a video a first object that moves depicted in the video. The method also can include determining an initial size of a first set of radial lines to emanate from the first object, the first set of radial lines comprising a first plurality of radial lines. The method also can include rendering, in an enhanced video comprising the video, the first set of radial lines emanating from the first object using the initial size of the first set of radial lines, the enhanced video configured to be presented on at least one display. The method also can include, responsive to detecting a first movement of the first object indicating a size of the first object is increasing in the video, increasing a length of each of the first plurality of radial lines in the first set of radial lines. The method also can include, responsive to detecting a second movement of the first object indicating the size of the first object is decreasing in the video, decreasing the length of each of the first plurality of radial lines in the first set of radial lines. The method also can include, responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

A system includes a processor programmed to initiate executable operations. The executable operations include identifying in a video a first object that moves depicted in the video. The executable operations also can include determining an initial size of a first set of radial lines to emanate from the first object, the first set of radial lines comprising a first plurality of radial lines. The executable operations also can include rendering, in an enhanced video comprising the video, the first set of radial lines emanating from the first object using the initial size of the first set of radial lines, the enhanced video configured to be presented on at least one display. The executable operations also can include, responsive to detecting a first movement of the first object indicating a size of the first object is increasing in the video, increasing a length of each of the first plurality of radial lines in the first set of radial lines. The executable operations also can include, responsive to detecting a second movement of the first object indicating the size of the first object is decreasing in the video, decreasing the length of each of the first plurality of radial lines in the first set of radial lines. The executable operations also can include, responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

A computer program product includes a computer readable storage medium having program code stored thereon. The program code is executable by a data processing system to initiate operations. The operations include identifying in a video a first object that moves depicted in the video. The operations also can include determining an initial size of a first set of radial lines to emanate from the first object, the first set of radial lines comprising a first plurality of radial lines. The operations also can include rendering, in an enhanced video comprising the video, the first set of radial lines emanating from the first object using the initial size of the first set of radial lines, the enhanced video configured to be presented on at least one display. The operations also can include, responsive to detecting a first movement of the first object indicating a size of the first object is increasing in the video, increasing a length of each of the first plurality of radial lines in the first set of radial lines. The operations also can include, responsive to detecting a second movement of the first object indicating the size of the first object is decreasing in the video, decreasing the length of each of the first plurality of radial lines in the first set of radial lines. The operations also can include, responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 3 is a flowchart illustrating an example process of identifying one or more moving objects in a video and determining various parameters for the object(s).

FIG. 4 is a flowchart illustrating an example process of generating video effects frames for a video.

DETAILED DESCRIPTION

Figure 1:
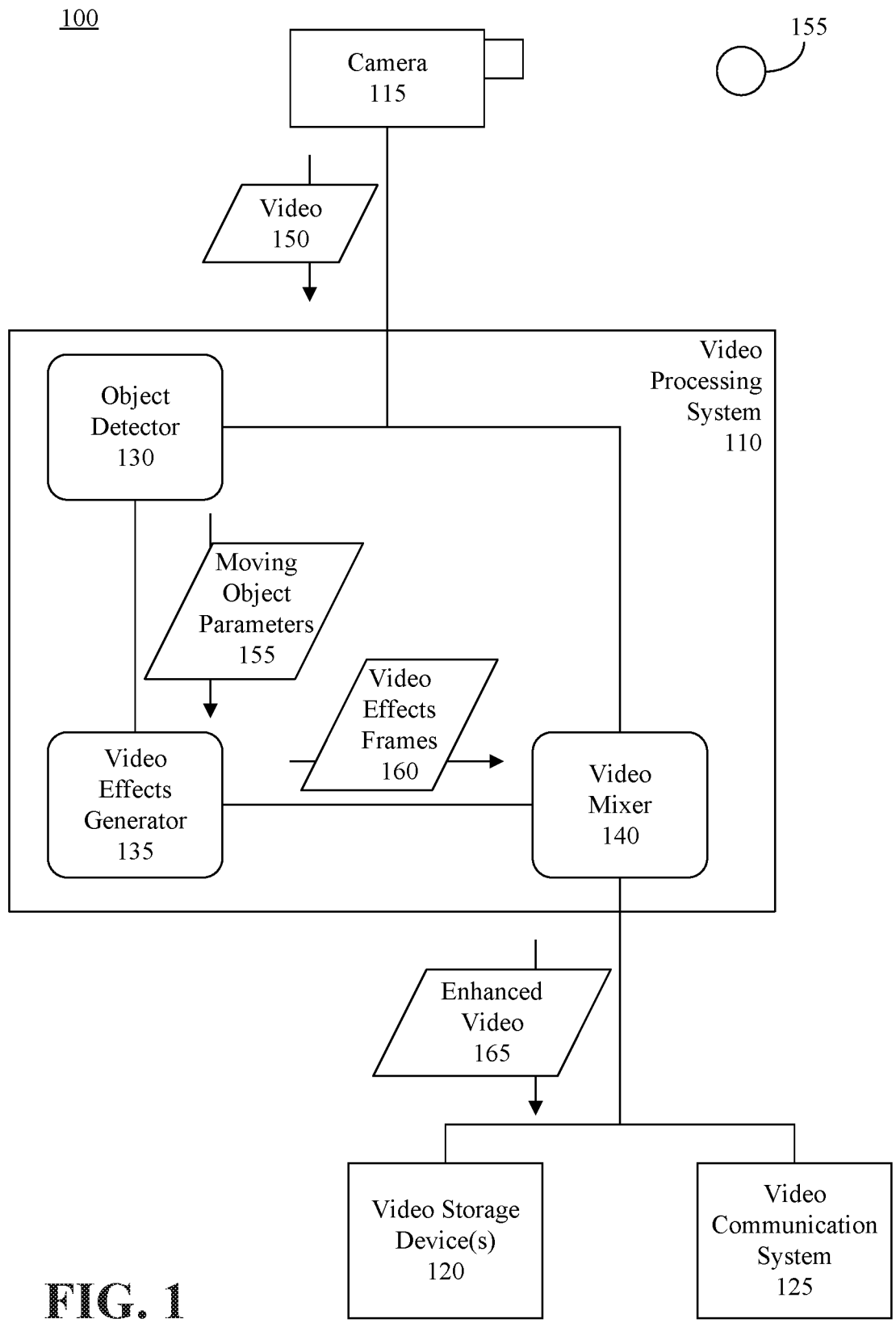
FIG. 1 is a block diagram illustrating an example of a video processing environment.

This disclosure relates to video presentation, and more specifically, to presentation of a video that depicts a moving object. In accordance with the inventive arrangements disclosed herein, a moving object depicted in a video can be identified. The video can be enhanced by rendering, in the video, radial lines around the object. The radial lines can indicate a movement of the object. This facilitates visual tracking of the moving object in the video by people viewing the video.

In illustration, assume the moving object is a ball being played during a sporting event. As video commonly is presented on a display in two-dimensions, sometimes it is difficult for viewers to conceptualize the actual three-dimensional movement of the ball in the real world. The arrangements described herein aid viewers in conceptualizing such movement when viewing video of the sporting event on a display.

Several definitions that apply throughout this document now will be presented.

As defined herein, the term "video" means a sequence of visual images, captured by a camera (e.g., a video camera), configured to be presented on a display in the sequence the visual images are captured and at a particular frame rate. For example, a video can be configured to be broadcast (e.g., via a television broadcast) and/or streamed (e.g., via the Internet). Video also can be recorded to an optical storage medium (e.g., a compact disc read-only memory (CD-ROM), a digital versatile disc (DVD), a Blu-ray disc, etc.), a magnetic storage medium (e.g., a video tape, a hard disc drive, etc.), an electronic storage medium (e.g., Flash memory), and do on.

As defined herein, the term "render" means to present in at least one image, for example to present in a video.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "video processing system" means one or more hardware systems configured to process video data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "viewer" means a person (i.e., a human being).

FIG. 1 is a block diagram illustrating an example of a video processing environment 100. The video processing environment can include a video processing system 110 communicatively linked to a camera 115 (e.g., a video camera) comprising one or more image sensors (e.g., charged coupled devices (CCDs), complementary metal-oxide semiconductors (CMOS), etc.). The video processing system 110 also can be communicatively linked to one or more video storage devices 120 (e.g., computer-readable storage mediums) and a video communication system 125, various types of which are well known in the art. The video communication system can be, for example, a video broadcast system, a video streaming system, or the like, configured to communicate the video to video presentation devices (e.g., televisions, video projectors, video displays, computers, mobile phones, etc.). The video communication system 125 can communicate the video using over the air radio frequency (RF) transmissions, via the Internet, or via any other suitable video communication medium. For instance, the video communication system 125 can include a television broadcast station comprising an RF amplifier and antenna, an Internet streaming device, and so on.

The video processing system 110 can be communicatively linked to the camera 115, video storage device 120 and video communication system 125 via any suitable communication technologies, for example one or more communication ports, one or more personal area networks (PANs), one or more local area networks (LANs), one or more wide area networks (WANs), one or more Virtual Private Networks (VPNs), the Internet, etc. In a non-limiting arrangement, the video processing system 110 can be a component integrated into the camera 115.

The video processing system 110 can include an object detector 130, a video effects generator 135 and a video mixer 140, which will be described in further detail.

Figure 2:
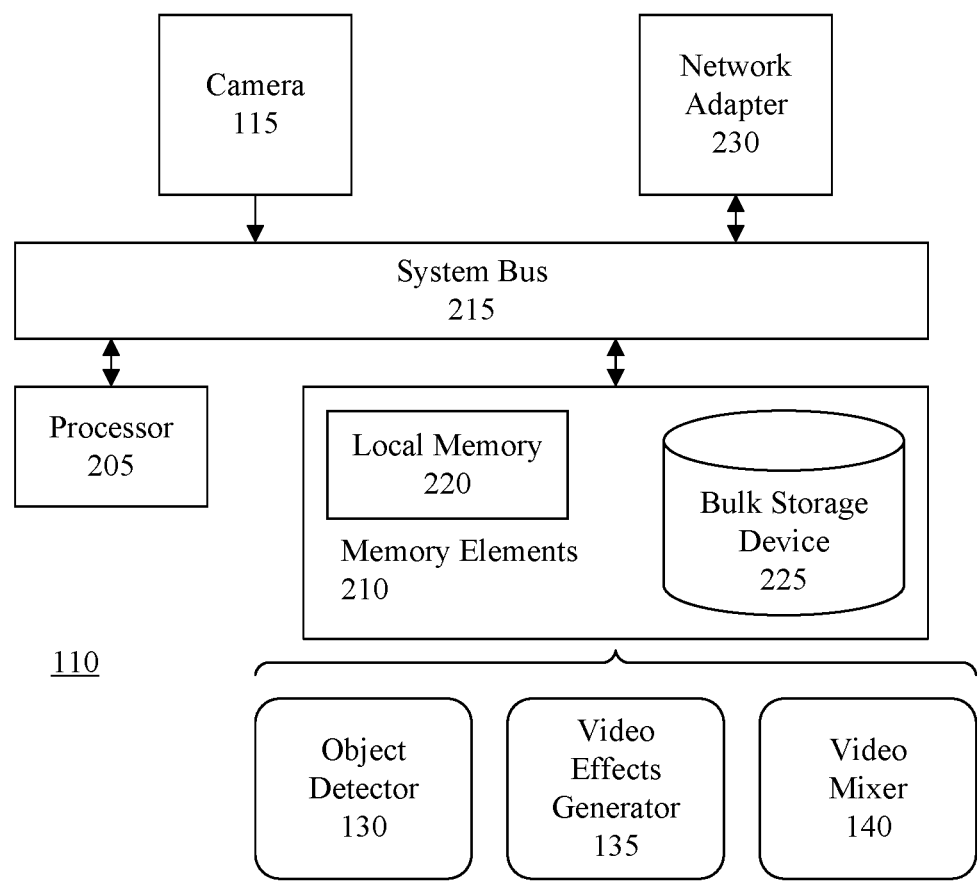
FIG. 2 is a block diagram illustrating example architecture for a video processing system.

FIG. 2 is a block diagram illustrating example architecture for the video processing system 110. The video processing system 110 can include at least one processor 205 (e.g., a central processing unit) coupled to memory elements 210 through a system bus 215 or other suitable circuitry. As such, the video processing system 110 can store program code within the memory elements 210. The processor 205 can execute the program code accessed from the memory elements 210 via the system bus 215. It should be appreciated that the video processing system 110 can be implemented in the form of any system including a processor and memory that is capable of performing the functions and/or operations described within this specification. For example, the video processing system 110 can be implemented as a server, a plurality of communicatively linked servers, a workstation, a desktop computer, a mobile computer, and so on. In another arrangement, the video processing system 110 can be a component of the camera 115, as noted.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The video processing system 110 also can include one or more cache memories (not shown) that provide temporary storage of at least some program code in order to reduce the number of times program code must be retrieved from the bulk storage device 225 during execution.

Input/output (I/O) devices, such as the camera 115, can be coupled to the video processing system 110. The I/O devices can be coupled to the video processing system 110 either directly or through intervening I/O controllers. One or more network adapters 230 also can be coupled to video processing system 110 to enable the video processing system 110 to become coupled to other systems, such as the video storage device 120 and video communication system 125 (FIG. 1) through intervening private or public networks. Modems, cable modems, transceivers, and Ethernet cards are examples of different types of network adapters 230 that can be used with the video processing system 110. In other arrangements, the video processing system 110 can be coupled to the video storage device(s) 120 and/or video communication system 125 directly or through intervening I/O controllers.

As pictured in FIG. 2, the memory elements 210 can store the components of the video processing system 110, namely the object detector 130, the video effects generator 135 and the video mixer 140. Being implemented in the form of executable program code, these components of the video processing system 110 can be executed by the video processing system 110 and, as such, can be considered part of the video processing system 110. Moreover, the object detector 130, video effects generator 135 and video mixer 140 are functional data structures that impart functionality when employed as part of the video processing system 110.

Referring again to FIG. 1, in operation, the camera 115 can capture video 150 of a scene where an object that moves (i.e., a moving object) 155 is located, for example a sporting event. The camera 115 can communicate the video 150 to the video processing system 110, in real time, as the video is captured by the camera 115. In an arrangement, the camera 115 can communicate the video 150 to the video processing system 110 as a digital video signal. In another arrangement, the camera 115 can communicate the video 150 to the video processing system 110 as an analog video signal and the video processing system can include an analog to digital converter (not shown) to convert the analog video signal to a digital video signal using techniques known in the art.

Within the video processing system 110, the object detector 130 can, in real time, identify the moving object 155 in the video 150. Further, the object detector 130 can determine, in real time, moving object parameters 155 indicating which direction the object 155 is moving and a magnitude of the movement.

FIG. 3 is a flowchart illustrating an example process 300 of identifying one or more moving objects in a video and determining various parameters for the object(s). The process 300 can be implemented by the object detector 130 in real time as each video frame of the video 150 is received by the video processing system 110 from the camera 115. The process 300 can repeat for each video frame as the video 150 continues to be received by the video processing system 110.

At step 302, the object detector 130 can receive a video frame received from the camera 115 by the video processing system 110.

At step 304, the object detector 130 can identify one or more moving objects depicted in the video frame by performing image processing on the video frame, which is known in the art. Such image processing can include object recognition, which also is known in the art.

In illustration, for an initial set of frames received prior to the current video frame, the object detector 130 can perform the object recognition to identify various objects depicted in the initial set of video frames, assign an object identifier to each object, determine a location of each object in each of the initial set of video frames, and generate location parameters indicating the locations of each object. The object detector 130 can store the location parameters for each object to the memory elements 210 in a manner that assigns the location parameters to the object identifier for that object and the video frame from which the locations parameters were determined. The object detector 130 can, for each object, determine whether the object is moving in the initial set of video frames by determining whether the location parameters for the object change through the video frames. For each object that is moving, the object detector 130 can assign a moving object tag to the object indicating that the object is a moving object. In subsequent video frames, such as the current video frame received at step 302, the object detector 130 can identify moving objects by identifying objects in the video frames that are assigned the moving object tag.

In a non-limiting example, only certain objects in the video frame need be identified as moving objects, even though other objects may be moving. Moreover, video effects, which will be described herein, need only be applied to the objects identified as moving objects. For example, if the video is of a soccer game, the video effects need only be applied to the soccer ball that is moving, but need not be applied to the soccer players, even though the soccer players also may be moving. Such an arrangement can improve the performance of the video processing system 110 at performing the processes described herein by reducing the amount of data that need be processed. Nonetheless, the present arrangements are not limited in this regard, and in other arrangements the video effects can be applied to various other objects, such as the soccer players.

In illustration, within the memory elements 210 of the video processing system 110, image data for various objects that are of interest can be stored. For instance, if the video processing system 110 is being used to enhance video of a soccer game, sample image data for a soccer ball can be stored in the memory elements 210. Similarly, if the video processing system 110 is being used to enhance video of an automobile race, sample image data for one or more automobiles can be stored in the memory elements 210. Further, sample image data for any other objects can be stored in the memory elements 210 and the present arrangements are not limited in this regard. To identify the one or more objects depicted in the video frame, the object detector 130 can perform object recognition on the video frame to identify in the video frame one or more objects that match, or at least partially match, the sample image data.

Although a scene in the real world is three-dimensional, video of the scene typically is a sequence of two-dimensional images. Accordingly, the location parameters can be specified in the two-dimensional plane of the current video image. It is common for cameras to pan left, right, up and down while recording video. Thus, absolute coordinates in a video frame sometimes may not be sufficient for specifying a current location of an object. To account for camera panning, the object detector 130 can identify one or more objects in the scene which are stationary, for example structures, trees, mountains, etc., and determine the location of each other object relative to one or more of the stationary objects. The object detector 130 can identify moving objects by determining which objects move in relation to the stationary objects. In this regard, the sample image data can include image data for various types of stationary objects, and such sample image data can be assigned tags indicating that those types of objects are stationary. This can facilitate identification of the stationary objects in the video 150 by the object detector 130.

At step 306, the object detector 130 can, for each identified moving object in the current video frame, determine a current location of the moving object in the video frame and generate a corresponding location parameter. The object detector 130 can store the location parameter to the memory elements 210 in a manner that assigns the location parameter to the object identifier for the moving object and the current video frame.

At step 308, the object detector 130 can, for each identified moving object in the current video frame, determine a metric including at least one dimension of a depiction of the moving object in the current video frame and generate at least one corresponding dimension parameter. For example, if the moving object is round, the object detector 130 can determine a diameter of the moving object as depicted in the current video image and store the determined diameter as the dimension parameter. If the object has a more complex shape, the object detector 130 can identify at least two features of the object and measure at least one spatial length between those features as depicted in the video image, and store that spatial length as the dimension parameter to the memory elements 210. For example, if the object is an automobile the object detector 130 can measure as the spatial length a distance between an uppermost portion of the automobile's chassis and a lowermost portion of the automobile's chassis.

At step 310, the object detector 130 can, for each identified object determined to be moving, determine the moving object parameters 155 indicating movement of the object (e.g., a movement vector). As noted, although a scene in the real world is three-dimensional, video of the scene typically is a sequence of two-dimensional images. The object detector 130 can determine the direction and relative speed of the movement in the two-dimensions depicted by the video images by comparing the current location data for the object to the location data for that object stored for one or more previous video frames. For example, the object detector 130 can compare the two-dimensional coordinates of the object location in the current video frame to the two-dimensional coordinates of the object location in the previous video frame to determine the direction and distance the object moved between the respective video frames. The object detector 130 can determine a relative speed of the movement by dividing a value of the determined distance the object moved and by a value indicating the duration of time elapsed between the respective video frames being captured. It should be noted that the relative speed of the movement need not be the actual speed the object is moving in the real world. Instead, the relative speed indicates the rate at which the object appears to move in the two-dimensional images, which is sufficient for generating the video effects that will be described herein.

To determine movement of the object in a third dimension away from or toward the camera 115, the object detector 130 can compare the dimension parameter(s) for the moving object for the current video frame to dimension parameter(s) for the object stored for one or more previous video frames. In illustration, if the object is round, the object detector 130 can compare a diameter of the moving object in the current video frame to a diameter of the moving object in a previous video frame. If the diameter increases from the previous video frame to the current video frame, the object detector 130 can determine that the object is moving toward the camera 115. If, however, the diameter decreases from the previous video frame to the current video frame, the object detector 130 can determine that the object is moving away from the camera 115. Further, the object detector 130 can determine a relative speed of the object movement toward or away from the camera 115 by determining the change in diameter and dividing that value by a value representing the duration of time elapsed between the video frames being compared. In a non-limiting arrangement, the object detector 130 can implement visual looming techniques known in the art to determine motion of moving objects, for example motion toward the camera 115 and/or motion away from the camera 115, based on texture density and/or surface slant of the objects in the video frames.

The previous video frames to which the two-dimensional coordinates of the object location and/or the dimension parameter(s) are compared can be a threshold number of previous video frames or previous video frames generated over a threshold period of time prior to the current video frame. The threshold number of previous video frames or the threshold period of time can be pre-determined. The object detector 130 can purge from the memory elements 210 the location parameters and/or dimension parameter(s) for previous video frames no longer within the threshold number of frames or period of time, which serves to minimize the amount of memory resources being utilized to store such data.

At step 312, the object detector 130 can, for each identified moving object, output as moving object parameters 155 the identifier for the object, the location parameters for the moving object, the dimension parameter(s) for the object, the movement parameters for the moving object, and a video frame identifier (e.g., a time stamp) indicating the current video frame for which the various parameters were generated. The object detector 130 can output the moving object parameters 155 to the video effects generator 135.

Referring again to FIG. 1, the video effects generator 135 can process the moving object parameters 155 to generate a video effects frame 160 to be applied to the depiction of each of the identified moving objects in the current video frame.

FIG. 4 is a flowchart illustrating an example process 400 of generating video effects frames 160 for a video. The process 400 can be implemented by the video effects generator 135 in real time as each video frame of the video 150 is received by the video processing system 110 from the camera 115. The process 400 can repeat for each video frame as the video 150 continues to be received by the video processing system 110.

At step 402 the video effects generator 135 can receive the moving object parameters 155 from the object detector 130.

At step 404, the video effects generator 135 can process the moving object parameters 155 to identify the current frame to which the moving object parameters apply and identify each moving object indicated by the moving object parameters. Further, by processing the moving object parameters 155, the video effects generator 135 can, for each identified moving object and the current video frame, identify a location of the moving object in the current video frame, identify the dimension parameter(s) and identify the movement parameters.

At step 406, the video effects generator 135 can, for each identified moving object, generate video effects to be applied to a depiction of the moving object in the current video frame based on the dimension parameter(s) and the movement parameters for that moving object indicated by the moving object parameters 155. Examples of video effects are described below in greater detail.

At step 408, the video effects generator 135 can, for each identified moving object, determine a location in the current video frame to depict the video effects generated for that object. The video effects generator 135 can determine the location based on the location parameters for the moving object indicated by the moving object parameters 155.

At step 410, the video effects generator 135 can, for the current video frame, generate a video effects frame 160 comprising the generated video effects for each identified moving object. In the video effects frame 160, the video effects generator 135 can specify the video effects generated for each moving object at a location corresponding to the location of the respective moving object in the current video frame. For example, if the video effects are to appear to be emanating from the moving object, a center of the video effects can be positioned at location of the center of the moving object. In this regard, the video effects can be positioned to appear to be emanating from a perimeter of the moving object, as will be described. The video effects generator 135 can output the video effects frame 160 to the video mixer 140.

Referring again to FIG. 1, the video mixer 140 can merge the video effects frame 160 generated for the current video frame with the current video frame to render the video effects in the current video frame. The video mixer 140 can output a corresponding enhanced video frame in enhanced video 165, and continue the process as each new video frame of the video 150 is received. Merging of video effects frames with video frames by video mixers is known in the art.

For example, to generate an enhanced video frame, the video mixer 140 can digitally overlay the video effects frame 160 for the current video frame onto the current video frame. In a non-limiting arrangement, the video mixer 140 can identify in the video effects frame 160 pixels where the video effects are rendered for the current video frame, and add those pixels to the current video frame, replacing the original pixels in the current video frame with the corresponding video effects pixels. In another non-limiting arrangement, the video effects generator 135 can specify the video effects as objects, for example objects contained in a JavaScript® library, and assign to those objects object parameters as a video effects frame 160. To generate a corresponding video frame for the enhanced video 165, the video mixer 140 can identify in the video effects frame 160 the object parameters, receive the corresponding objects from the JavaScript® library, and render the objects in the corresponding video frame for the enhanced video 165 according to the object parameters.

The video mixer 140 can communicate the enhanced video 165 to the video storage device(s) 120 and/or to the video communication system 125. In an arrangement, the video mixer 140 can communicate the enhanced video 165 to the video storage device(s) 120 and/or video communication system 125 as a digital video signal. In another arrangement, the video processing system 110 can include a digital to analog converter (not shown) to convert the enhanced video 165 to an analog video signal using techniques known in the art and communicate the enhanced video 165 to the video storage device(s) 120 and/or video communication system 125 as an analog video signal.

Figure 5:
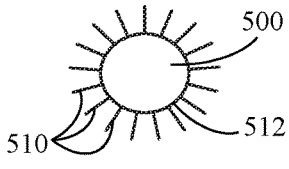
FIG. 5 depicts examples of video effects rendered in an enhanced video for a moving object.

FIG. 5 depicts examples of video effects rendered in an enhanced video 165 for a moving object 500. In the column titled "Rearward Movement," the object 500 is moving away from the camera 115 (FIG. 1) through successive video frames n, n+1, n+2. To facilitate perception of the moving object 500 by viewers during presentation of the enhanced video 165, the video effects applied to the video frames by the video effects generator 135 can include a set of radial lines, comprising a plurality of radial lines 510, emanating from the object 500. A first end of each radial line 510 can touch, or can be proximate to (e.g., within a threshold distance of), a perimeter 512 of a depiction of the object 500 in the video frame.

In an arrangement, the radial lines 510 can be specified by the video effects generator 135 based on the determination that the object 500 is moving away from the camera 115. Moreover, the video effects generator 135 can specify the radial lines 510 to be a first length in video frame n, a second length shorter than the first length in video frame n+1, and a third length shorter than the second length in video frame n+2. In an arrangement, the first length in the video frame n can be an initial size of the radial lines 510 determined based on a metric including at least one dimension of a depiction of the object 500, for example a diameter of the object. Further, the length of the radial lines 510 rendered for each video frame can be proportional to the metric as measured in the respective video frame by the object detector 130.

Further, the video effects generator 135 can specify changes to the color of the radial lines 510 so that the color of the radial lines 510 changes from video frame n to video frame n+1, and again from video frame n+1 to video frame n+2. For example, the video effects generator 135 can specify a light color for the radial lines 510, and darken that color, or specify darker colors, as the object 500 moves away from the camera 115 in successive video frames.

In the column titled "Forward Movement," the object 500 is moving toward from the camera 115 through successive video frames n, n+1, n+2. It should be noted that "n, n+1, n+2" merely indicate a sequence of video frames, and the sequence of video frames in the column titled "Forward Movement" are not the same video frames in the column titled "Rearward Movement."

Again, to facilitate perception of the moving object 500 by viewers during presentation of the enhanced video 165, the video effects applied to the video frames can include a set of radial lines, comprising a plurality of radial lines 520, emanating from the object 500. A first end of each radial line 520 can touch, or can be proximate to (e.g., within a threshold distance of), a perimeter 512 of a depiction of the object 500 in the video frame.

In an arrangement, the radial lines 520 can be specified by the video effects generator 135 based on a determination that the object 500 is moving or toward the camera 115. For example, the radial lines 520 can be longer than the radial lines 510 selected when the object 500 is moving away from the camera 115. Moreover, the video effects generator 135 can specify the radial lines 520 to be a first length in video frame n (which may be different than a first length of the radial lines 510), a second length longer than the first length in video frame n+1, and a third length longer than the second length in video frame n+2. As noted, the length of the radial lines 510 rendered for reach video frame can be proportional to a dimension of the object 500, for example a diameter of the object 500, in the respective video frame as measured by the object detector 130.

Again, the video effects generator 135 can specify changes to the color of the radial lines 520 so that the color of the radial lines 510 changes from video frame n to video frame n+1, and again from video frame n+1 to video frame n+2. For example, the video effects generator 135 can specify a dark color for the radial lines 510, and lighten that color, or specify lighter colors, as the object 500 moves toward from the camera 115 in successive video frames.

Figure 6:
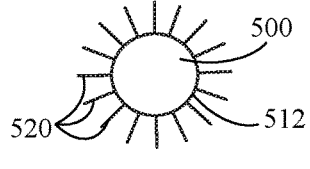
FIG. 6 depicts further examples of video effects rendered in an enhanced video for a moving object.

FIG. 6 depicts further examples of video effects rendered in an enhanced video 165 for a moving object 600. In the column titled "Rearward Movement," the object 600 is moving away from the camera 116 (FIG. 1) through successive video frames n, n+1, n+2. To facilitate perception of the moving object 600 by viewers during presentation of the enhanced video 165, the video effects applied to the video frames can include a set of radial lines, comprising a plurality of radial lines 610, emanating from the object 600. The radial lines 610 each can include a respective arrow 614 pointing toward the object 600. For example, the arrows 614 can be positioned at an end of each radial line 610 touching, or proximate to (e.g., within a threshold distance of), a perimeter 612 of a depiction of the object 600 in the video frame. In an arrangement, the radial lines 610 can be specified by the video effects generator 135 based on the determination that the object 600 is moving away from the camera 115. Moreover, the video effects generator 135 can specify the radial lines 610 to be a first length in video frame n, a second length shorter than the first length in video frame n+1, and a third length shorter than the second length in video frame n+2. In this regard, the length of the radial lines 610 rendered for reach video frame can be proportional to a dimension of the object 600, for example a diameter of the object 600, in the respective video frame as measured by the object detector 130.

In the column titled "Forward Movement," the object 600 is moving toward from the camera 115 through successive video frames n, n+1, n+2. It should be noted that "n, n+1, n+2" merely indicate a sequence of video frames, and the sequence of video frames in the column titled "Forward Movement" are not the same video frames in the column titled "Rearward Movement."

Again, to facilitate perception of the moving object 600 by viewers during presentation of the enhanced video 165, the video effects applied to the video frames can include a set of radial lines, comprising a plurality of radial lines 620, emanating from the object 600. The radial lines 620 each can include a respective arrow 624 pointing away from the object 600. For example, the arrows 624 can be positioned at an end of each radial line 610 most distal from a perimeter 612 of a depiction of the object 600 in the video frame. In an arrangement, the radial lines 620 can be specified by the video effects generator 135 based on a determination that the object 600 is moving or toward the camera 115. For example, the radial lines 620 can be longer than the radial lines 610 selected when the object 600 is moving away from the camera 115. Moreover, the video effects generator 135 can specify the radial lines 620 to be a first length in video frame n (which may be different than a first length of the radial lines 610), a second length longer than the first length in video frame n+1, and a third length longer than the second length in video frame n+2. As noted, the length of the radial lines 610 rendered for reach video frame can be proportional to a dimension of the object 600, for example a diameter of the object 600, in the respective video frame as measured by the object detector 130.

Figures 7, 8:
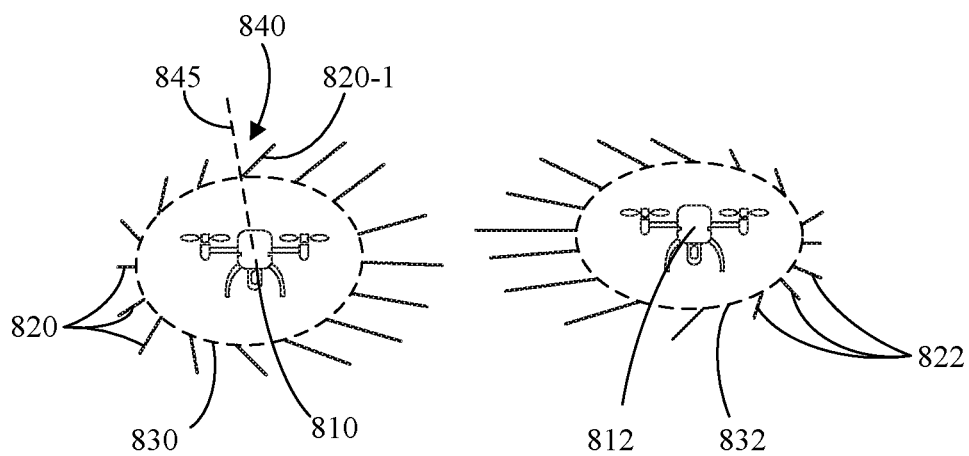
FIG. 7 depicts further examples of video effects rendered in an enhanced video for a moving object.
FIG. 8 depicts further examples of video effects rendered in an enhanced video for a moving object.

FIG. 7 depicts further examples of video effects rendered in an enhanced video 165 for a moving object 700. In the column titled "Left-Rearward Movement," the object 700 is moving away from the camera 115 (FIG. 1) and in the left direction in a scene through successive video frames n, n+1, n+2. To facilitate perception of the moving object 700 by viewers during presentation of the enhanced video 165, the video effects applied to the video frames can include a set of radial lines, comprising a plurality of radial lines 710, emanating from the object 700. In an arrangement, the radial lines 710 can be specified by the video effects generator 135 based on the determination that the object 500 is moving away from the camera 115 and to the left in the two-dimensional view of the enhanced video 165.

To indicate to viewers that the object 700 is moving to the left, the video effects applied to the video frames by the video effects generator 135 can include a set of radial lines, comprising a plurality of radial lines 710 emanating from the object 700. The radial lines 710 emanating from a leading edge of the object 700, which in this example is the left side 712 of the object 700, can be rendered to be shorter than the radial lines 710 emanating from a trailing edge of the object 700, which in this example is the right side 714 of the object. In this regard, moving from the left side 712 of the object 700 to the right side 714, the radial lines 710 can be progressively longer, where the shortest radial line 710 radially emanates from the object 700 in the direction the object 700 is moving and the longest radial line 710 emanates from the object 700 in a direction opposite the direction the object 700 is moving.

In illustration, assume that the object 700, in a previous video frame prior to a current video frame, is still in the two-dimensional plane of the video frame (although the object 700 may be moving toward or away from the camera 115). Accordingly, in the previous video frame, the radial lines 710 each can be the same length. Responsive to the moving object parameters 155 indicating that in the current video frame the object 700 is moving in the two-dimensional plane, the video effects generator 135 can decrease the length of the radial lines 710 emanating from the leading edge of the object 700 and increase the length of the radial lines 710 emanating from the trailing edge of the object 700.

Moreover, the directions the radial lines emanate from the object 700 can indicate the direction the object 700 is moving. For example, if the object 700 is moving left, the radial lines 710 on an upper side 716 and lower side 718 of the object 700 can be can slanted rightward, with respect to radial lines, which need not be rendered, extending from a center of the object 700 through the points on or near the perimeter of the object 700 where the radial lines emanate, so as to form an angle with respect to normal of the surface of the object. For instance, the radial line 710-1 can form an angle 720 with respect to a radial line 722 extending from a center of the object 700 to a point on the object from which the radial line 710-1 emanates. The video effects generator 135 can select the angle 720 based on the relative speed the object 700 is moving. In illustration, a magnitude of the angle 720 can be proportional to the relative speed of the object.

If the object is moving to the right, the radial lines 710 on the upper side 716 and lower side 718 of the object 700 can be can slanted leftward. If the object is moving to the upward, the radial lines 710 on the left side 712 and right side 714 of the object 700 can be can slanted downward. If the object is moving to the downward, the radial lines 710 on the left side 712 and right side 714 of the object 700 can be can slanted upward. Still, if the object is moving in any other direction, a portion of the radial lines 710 can be slanted away from such direction of movement to indicate such movement in a similar manner.

The video effects generator 135 can dynamically change the length (e.g., increase or decrease the length) and/or the amount of slant of each radial line 710 to indicate a current movement vector of the object 700 as direction and/or speed of movement of the object 700 changes in the video 150. Thus, the length and/or slant of each radial line 710 can change from the video frame n to the video frame n+1 and then to the video frame n+2.

To indicate that the object 700 is moving rearward, away from the camera 115, the video effects generator 135 can progressively decrease the length of the radial lines 710 moving from the video frame n to the video frame n+1 and then to the video frame n+2. The decrease in length of the radial lines 710 can be proportional to the decrease in size of the object 700 through the successive frames n, n+1, n+2.

The lengths of the radial lines 710 in any particular video frame and the amount of slant applied to radial lines on the upper side 716 and lower side 718 of the object 700 can be selected based on how fast the object 700 is moving. For example, the faster the object 700 is moving, the shorter the radial lines 710 can be on the left side 712 of the object 700 and the longer the radial lines 710 can be on the right side 714 of the object 700. The slower the object is moving, the longer the radial lines 710 can be on the left side 712 of the object 700 and the shorter the radial lines 710 can be on the right side 714 of the object 700. In this regard, the video effects generator 135 can select various lengths for the radial lines 710 based on the determined relative speed of the object 700.

Further, the object 700 may stop from time to time. Responsive detecting that the object is stationary in the two-dimensional plane of the video 150, the video effects generator 135 can render the plurality of radial lines 710 to each have a same length and emanate radially from the object 700, without slanting away from the radial directions, for example as depicted in FIG. 5.

In the column titled "Left-Forward Movement," the object 700 is moving toward the camera 115 (FIG. 1) and in the left direction in a scene through successive video frames n, n+1, n+2. It should be noted that "n, n+1, n+2" merely indicate a sequence of video frames, and the sequence of video frames in the column titled "Left-Forward Movement" are not the same video frames in the column titled "Left-Rearward Movement."

Again, to facilitate perception of the moving object 700 by viewers during presentation of the enhanced video 165, the video effects applied to the video frames can include a set of radial lines, comprising a plurality of radial lines 730, emanating from the object 700. In an arrangement, the radial lines 730 can be specified by the video effects generator 135 based on a determination that the object 700 is moving toward the camera 115 and to the left in the two-dimensional view of the enhanced video 165. The radial lines 730 can be rendered as previously described to indicating the movement to the left. However, to indicate the object is moving toward the camera 115, the video effects generator 135 can progressively increase the length of the radial lines 730 moving from the video frame n to the video frame n+1 and then to the video frame n+2. The increase of length of the radial lines 730 can be proportional to the increase of size of the object 700 through the successive frames n, n+1, n+2.

It should be noted that similar processes can be applied to depict movement of the object 700 in other directions. In this regard, the video effects generator 135 can render the shortest radial lines 710, 730 to radially emanate from the object 700 in the direction the object 700 is moving and render the longest radial lines 710, 730 to radially emanate from the object in the direction opposite the direction the object 700 is moving.

FIG. 8 depicts further examples of video effects rendered in an enhanced video 165 for a plurality of moving objects 810, 812. In this example, the object 810 is moving to the left in the video and the object 812 is moving to the right in the video. The process described with respect to FIG. 7 can be applied to render, in the enhanced video 165, radial lines 820, 822 emanating from the respective objects that indicate their respective directions of movement.

In this example, ends of the radial lines need not touch the depiction of the respective objects 810, 812. Instead, the video effects generator 135 can define a perimeter 830, 832 around each respective object 810, 812, for example perimeters 830, 832 having elliptical or round shapes. The video effects generator 135 can specify the radial lines 820, 822 each to have an end touching the respective perimeters 830, 832 and extend away from the respective perimeters 830, 832. The perimeters 830, 832 need not be rendered in the video effects, in which case the perimeters 830, 832 would not be depicted in the enhanced video 165. The present arrangements are not limited in this regard, however. For example, the video effects generator 135 can render the perimeters 830, 832 in the video effects, for example using dashed, dotted or solid lines, in which case the perimeters 830, 832 would be depicted in the enhanced video 165. In a non-limiting arrangement, the video effects generator 135 can render the radial lines 820 in a different color than the radial lines 822, which can aid viewers in distinguishing between the objects 810, 812.

In this example, the object 810 is moving to the left in the video 150. To indicate such movement, at least a portion of the radial lines, for example radial lines 820 depicted above and below the object 810, can be slanted to the right with respect to radial lines, which need not be rendered, extending from a center of the object 810. In illustration, the radial line 820-1 can be slanted to form an angle 840 between the radial line 820-1 and a radial line 845 extending from the center of the object 810 through the perimeter 830 where the radial line 820-1 intersects the perimeter 830. A portion of the radial lines 822, for example radial lines 822 depicted above and below the object 812, can be slanted to the left in a similar manner to indicate that the object 812 is moving to the right in the video 150.

Figure 9:
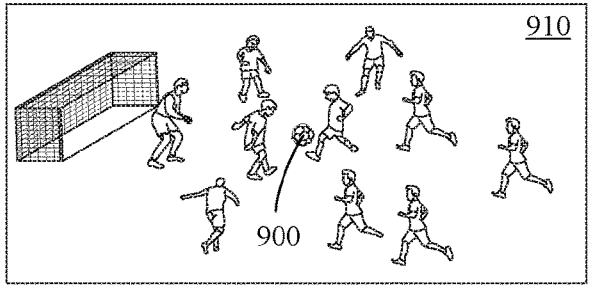
FIG. 9 depicts an example of a series of video frames of a video for which video effects are rendered in an enhanced video for a moving object depicted in the series of video frames.
Figure 9:
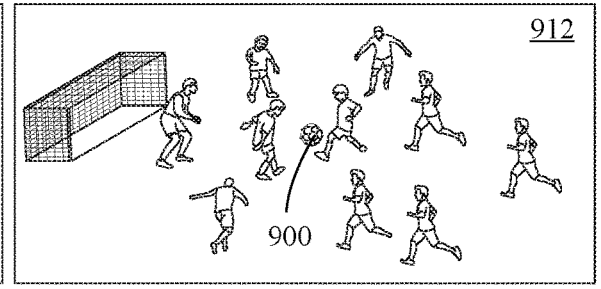
Figure 9:
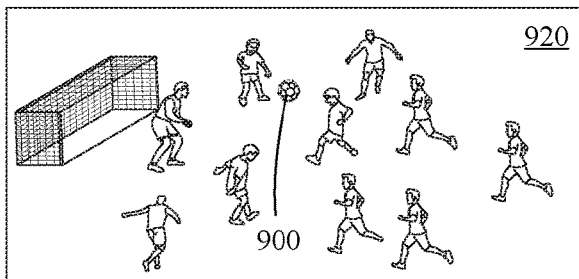
Figure 9:
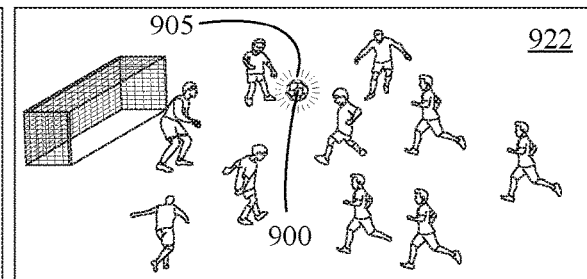
Figure 9:
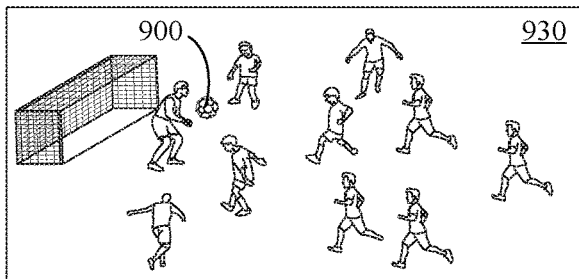
Figure 9:
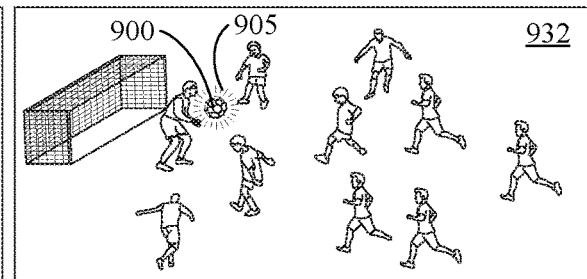
Figure 9:
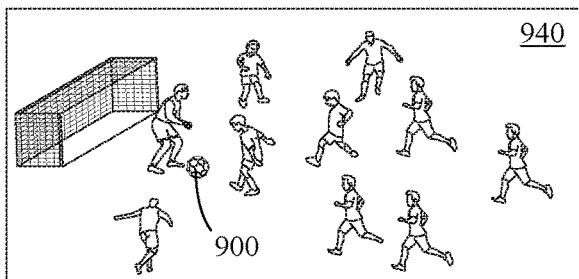
Figure 9:
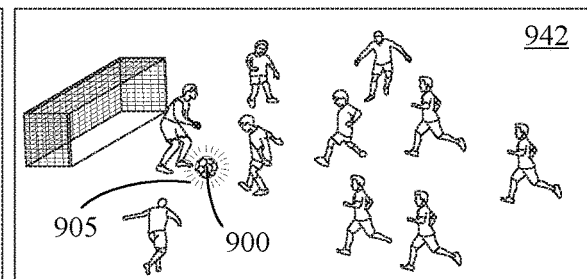
Figure 9:
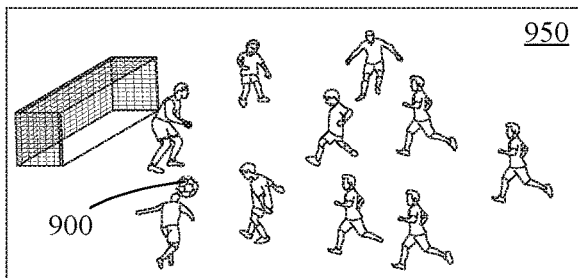
Figure 9:
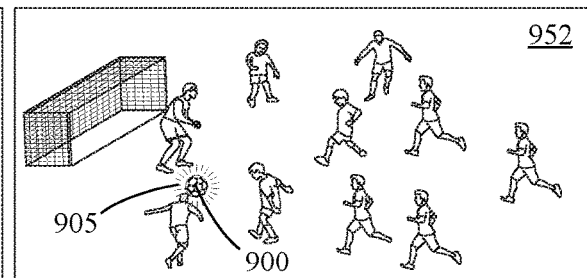

FIG. 9 depicts an example of a series of video frames of a video 150 for which video effects 905 are rendered in an enhanced video 165 for a moving object 900 depicted in the series of video frames. In this example, the object 900 is a soccer ball being played in a soccer game, as depicted in video frames 910, 920, 930, 940, 950 of the video 150. The video frames 912, 922, 932, 942, 952 of the enhanced video 165 comprise the video frames 910, 920, 930, 940, 950, respectively. As noted, the video effects 905 can facilitate visual tracking of the object 900 by people viewing the enhanced video 165.

Initially, a threshold number of video frames of the video 150 useful for determining the movement parameters for the object may not have been received by the video processing system 110 in order to determine moving object parameters 155 for the object 900 and generate corresponding video effects frames 160. Accordingly, in this example, the video effects 905 have not yet been generated for the enhanced video 165 in video frame 912.

Based on object detection performed by the object detector 130 on the video frames 910, 920, and perhaps a threshold number of video frames received prior to the video frame 910, the object detector 130 can determine the moving object parameters 155 for the object 900, the video effects generator 135 can generate a video effects frame for the video frame 920, and the video mixer 140 can merge that video effects frame with the video frame 920 to generate the video frame 922 depicting the video effects 905 applied to the object 900. The process can continue to generate the video frames 932, 942, 952 by merging the video frames 930, 940, 950, respectively, with corresponding video effects frames 160 generated by the video effects generator 135. Accordingly, the video frames 932, 942, 952 can depict the video effects 905 applied to the object 900. In a non-limiting arrangement, the video effects 905 can be rendered to depict arrows on the radial lines depicted by the video effects 905, for example as described with respect to FIG. 6, to emphasize the object 900 moving away from, or toward, the camera 115. In a further non-limiting arrangement, the video effects 905 can be rendered to depict radial lines having different lengths and/or being slanted, for example as described with respect to FIGS. 7 and 8, to emphasize the object 900 moving left or right.

Figure 10:
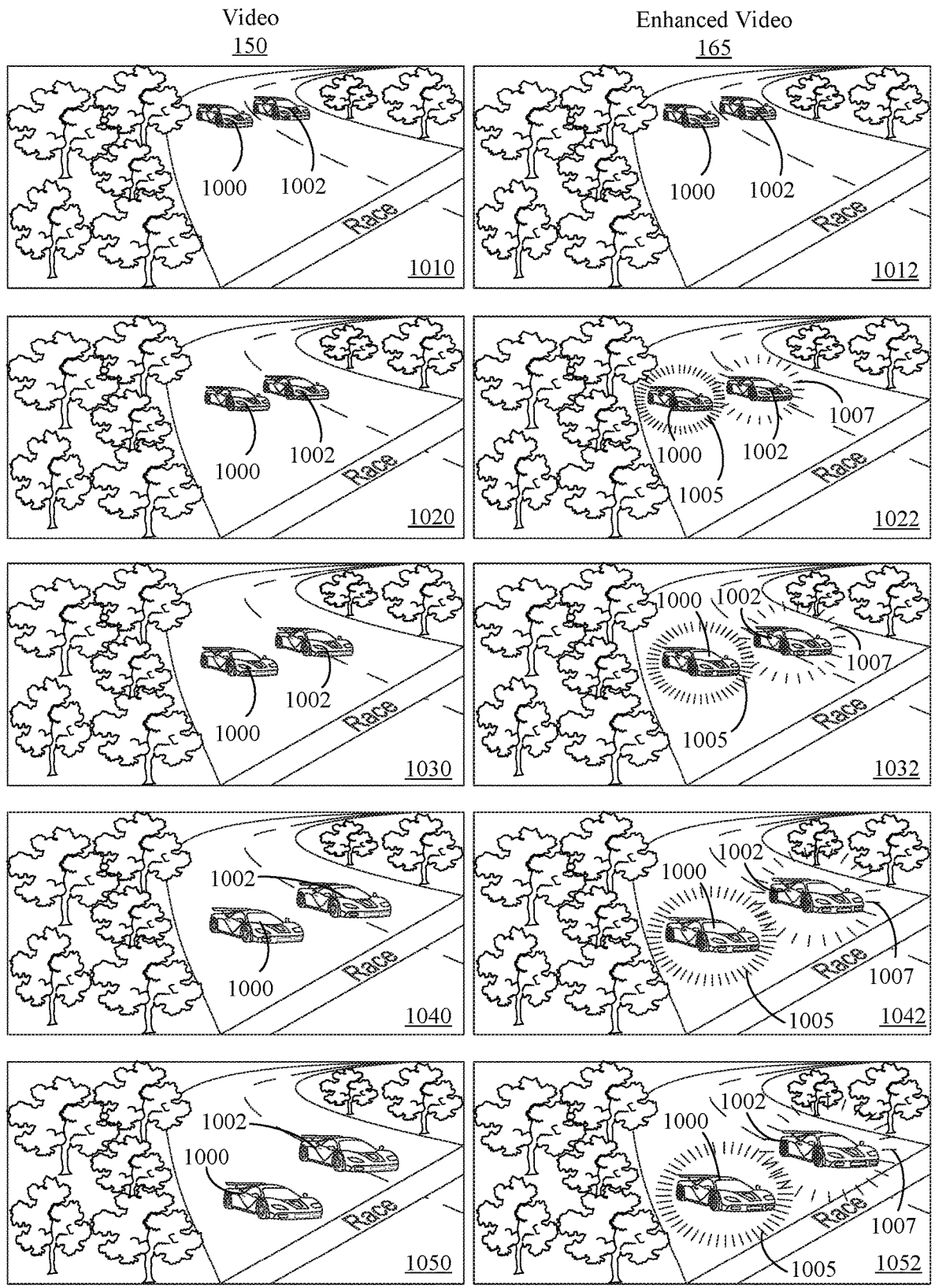
FIG. 10 depicts an example of a series of video frames of a video for which video effects are rendered in an enhanced video for a plurality of moving objects depicted in the series of video frames.

FIG. 10 depicts an example of a series of video frames of a video 150 for which video effects 1005, 1007 are rendered in an enhanced video 165 for a plurality of moving objects 1000, 1002, respectively, depicted in the series of video frames. In this example, the objects 1000, 1002 are automobiles in an automotive race, as depicted in video frames 1010, 1020, 1030, 1040, 1050 of the video 150. The video frames 1012, 1022, 1032, 1042, 1052 of the enhanced video 165 comprise the video frames 1010, 1020, 1030, 1040, 1050, respectively. As noted, the video effects 1005, 1007 can facilitate visual tracking of the objects 1000, 1002 by people viewing the enhanced video 165.

Initially, a threshold number of video frames of the video 150 useful for determining the movement parameters for the object may not have been received by the video processing system 110 in order to determine moving object parameters 155 for the objects 1000, 1002 and generate corresponding video effects frames 160. Accordingly, in this example, the video effects 1005, 1007 have not yet been generated for the enhanced video 165 in video frame 1012.

Based on object detection performed by the object detector 130 on the video frames 1010, 1020, and perhaps a threshold number of video frames received prior to the video frame 1010, the object detector 130 can determine the moving object parameters 155 for the objects 1000, 1002, the video effects generator 135 can generate a video effects frame for the video frame 1020, and the video mixer 140 can merge that video effects frame with the video frame 1020 to generate the video frame 1022 depicting the video effects 1005, 1007 applied to the objects 1000, 1002. The process can continue to generate the video frames 1032, 1042, 1052 by merging the video frames 1030, 1040, 1050, respectively, with corresponding video effects frames 160 generated by the video effects generator 135. Accordingly, the video frames 1032, 1042, 1052 can depict the video effects 1005, 1007 applied to the objects 1000, 1002.

In this example, the video effects 1007 can be rendered to appear different from the video effects 1005 to facilitate distinguishing the objects 1000, 1002 by viewers. For example, the video effects 1005 can comprise a larger number of radial lines emanating from the object 1000 than the number of radial lines emanating from the object 1002 in the video effects 1007. In another example, the video effects 1005 can be rendered in a color that is different than a color in which the video effects 1007 are rendered.

In a non-limiting arrangement, the video effects 1005, 1007 can be rendered to depict arrows on the radial lines depicted by the video effects 1005, 1007, for example as described with respect to FIG. 6, to emphasize the objects 1000, 1002 moving away from, or toward, the camera 115. In a further non-limiting arrangement, the video effects 1005, 1007 can be rendered to depict radial lines having different lengths and/or being slanted, for example as described with respect to FIGS. 7 and 8, to emphasize the objects 1000, 1002 moving left or right.

Figure 11:
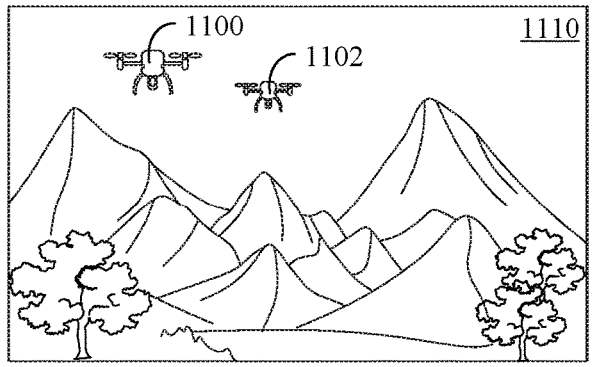
FIG. 11 depicts another example of a series of video frames of a video for which video effects are rendered in an enhanced video for a plurality of moving objects depicted in the series of video frames.
Figure 11:
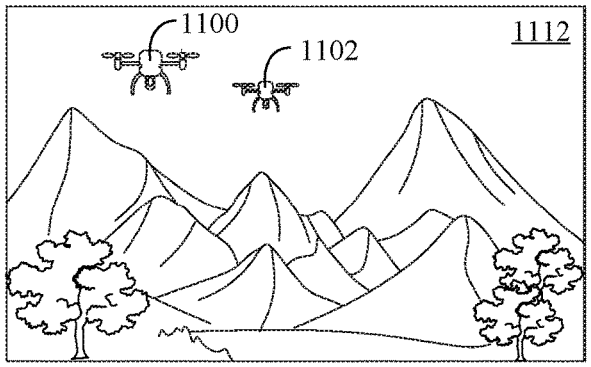
Figure 11:
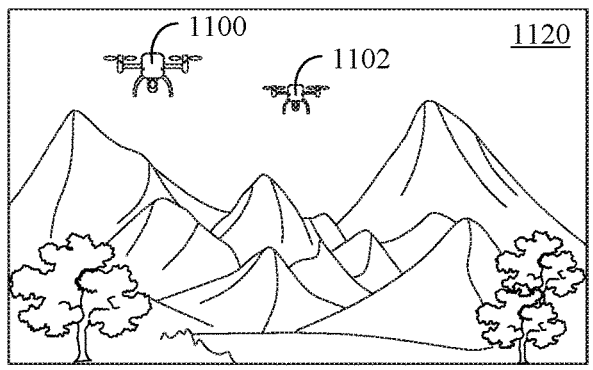
Figure 11:
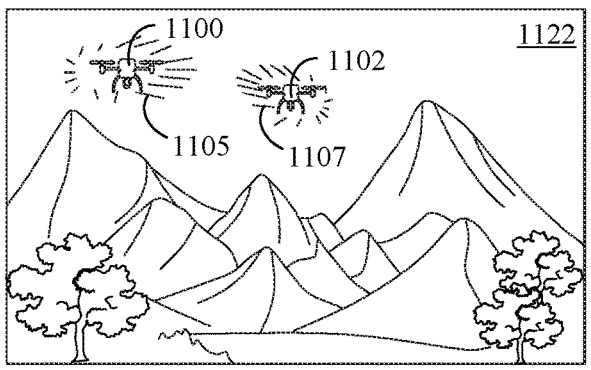
Figure 11:
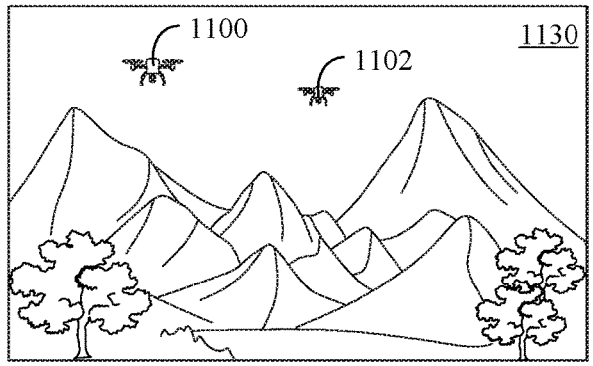
Figure 11:
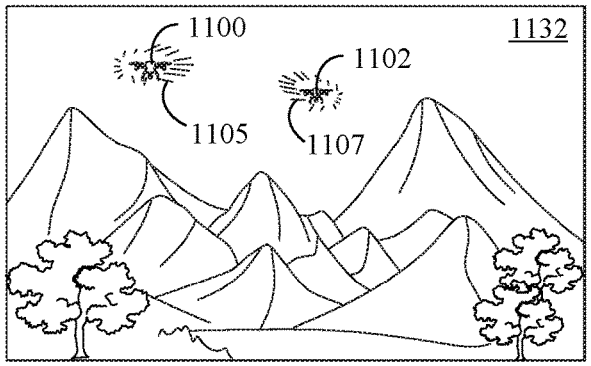
Figure 11:
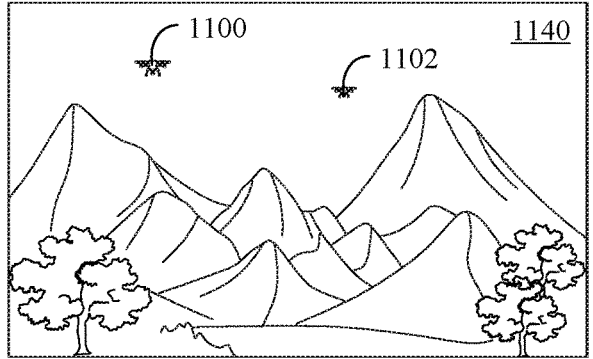
Figure 11:
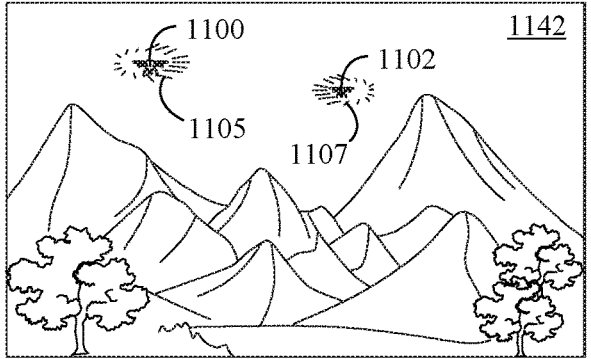

FIG. 11 depicts another example of a series of video frames of a video 150 for which video effects are rendered in an enhanced video 165 for a plurality of moving objects 1100, 1102 depicted in the series of video frames. In this example, the objects 1000, 1002 are drones that are flying, as depicted in video frames 1110, 1120, 1130, 1140 of the video 150. The video frames 1112, 1122, 1132, 1142 of the enhanced video 165 comprise the video frames 1110, 1120, 1130, 1140, respectively. As noted, the video effects 1105, 1107 can facilitate visual tracking of the objects 1100, 1102 by people viewing the enhanced video 165.

Initially, a threshold number of video frames of the video 150 useful for determining the movement parameters for the object may not have been received by the video processing system 110 in order to determine moving object parameters 155 for the objects 1100, 1102 and generate corresponding video effects frames 160. Accordingly, in this example, the video effects 1105, 1107 have not yet been generated for the enhanced video 165 in video frame 1112.

Based on object detection performed by the object detector 130 on the video frames 1110, 1120, and perhaps a threshold number of video frames received prior to the video frame 1110, the object detector 130 can determine the moving object parameters 155 for the objects 1100, 1102, the video effects generator 135 can generate a video effects frame for the video frame 1120, and the video mixer 140 can merge that video effects frame with the video frame 1120 to generate the video frame 1122 depicting the video effects 1105, 1107 applied to the objects 1100, 1102. The process can continue to generate the video frames 1132, 1142 by merging the video frames 1130, 1140, respectively, with corresponding video effects frames 160 generated by the video effects generator 135. Accordingly, the video frames 1132, 1142 can depict the video effects 1105, 1107 applied to the objects 1100, 1102.

In this example, the video effects 1107 can be rendered to appear different from the video effects 1105 to facilitate distinguishing the objects 1100, 1102 by viewers. For example, the video effects 1105 can comprise a larger number of radial lines emanating from the object 1100 than the number of radial lines emanating from the object 1102 in the video effects 1107. In another example, the video effects 1105 can be rendered in a color that is different than a color in which the video effects 1107 are rendered.

In a non-limiting arrangement, the video effects 1105, 1107 can be rendered to depict radial lines having different lengths and/or being slanted, for example as described with respect to FIGS. 7 and 8, to emphasize the objects 1100, 1102 moving left or right. In a further non-limiting arrangement, the video effects 1105, 1107 can be rendered to depict arrows on the radial lines depicted by the video effects 1105, 1107, for example as described with respect to FIG. 6, to emphasize the objects 1100, 1102 moving away from, or toward, the camera 115.

Figure 12:
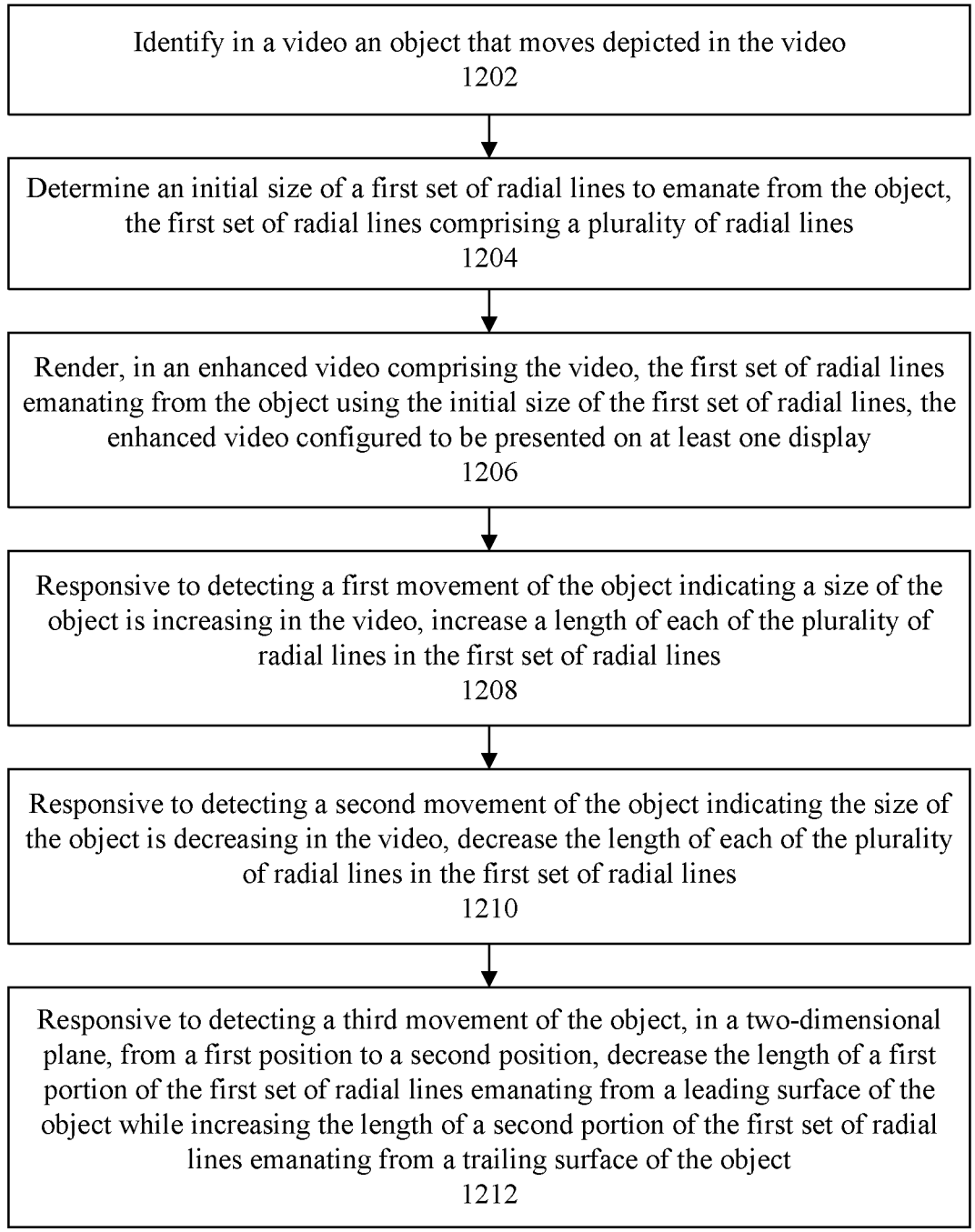
FIG. 12 is a flowchart illustrating an example of a method of generating enhanced video comprising video effects for at least one object depicted in a video.

FIG. 12 is a flowchart illustrating an example of a method 1200 of generating enhanced video comprising video effects for at least one object depicted in a video. The method 1200 can be implemented by the video processing system 110 of FIG. 1.

At step 1202, the video processing system 110 can identify in a video an object that moves depicted in the video.

At step 1204, the video processing system 110 can determine an initial size of a first set of radial lines to emanate from the object, the first set of radial lines comprising a plurality of radial lines.

At step 1206, the video processing system 110 can render, in an enhanced video comprising the video, the first set of radial lines emanating from the object using the initial size of the first set of radial lines, the enhanced video configured to be presented on at least one display.

At step 1208, the video processing system 110 can, responsive to detecting a first movement of the object indicating a size of the object is increasing in the video, increase a length of each of the plurality of radial lines in the first set of radial lines.

At step 1210, the video processing system 110 can, responsive to detecting a second movement of the object indicating the size of the object is decreasing in the video, decrease the length of each of the plurality of radial lines in the first set of radial lines.

At step 1212, the video processing system 110 can, responsive to detecting a third movement of the object, in a two-dimensional plane, from a first position to a second position, decrease the length of a first portion of the first set of radial lines emanating from a leading surface of the object while increasing the length of a second portion of the first set of radial lines emanating from a trailing surface of the object.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying, using a processor, in a video a first object that moves depicted in the video;
   determining an initial size of a first set of radial lines to emanate from the first object, the first set of radial lines comprising a first plurality of radial lines;
   rendering, in an enhanced video comprising the video, the first set of radial lines emanating from the first object using the initial size of the first set of radial lines, the enhanced video configured to be presented on at least one display;

responsive to detecting a first movement of the first object indicating a size of the first object is increasing in the video, increasing a length of each of the first plurality of radial lines in the first set of radial lines;

responsive to detecting a second movement of the first object indicating the size of the first object is decreasing in the video, decreasing the length of each of the first plurality of radial lines in the first set of radial lines; and responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

2. The method of claim 1, further comprising:
responsive detecting that the first object is stationary in the two-dimensional plane, rendering the first plurality of radial lines to each have a same length.

3. The method of claim 1, further comprising:
responsive to the identifying the first object that moves that is depicted in the video, determining a metric including at least one dimension of a depiction of the first object in the video;
wherein the initial size of the first set of radial lines is determined based on the metric including the at least one dimension of the depiction of the first object in the video.

4. The method of claim 1, further comprising:
responsive to the detecting the first movement of the first object indicating the size of the first object is increasing in the video, rendering the radial lines to include arrows pointing away from the first object; and
responsive to the detecting the second movement of the first object indicating the size of the first object is decreasing in the video, rendering the radial lines to include arrows pointing toward the first object.

5. The method of claim 1, further comprising:
responsive to the detecting the first movement of the first object indicating the size of the first object is increasing in the video, rendering the radial lines to have a color that becomes lighter through successive frames of the video; and
responsive to the detecting the second movement of the first object indicating the size of the first object is decreasing in the video, rendering the radial lines to have a color that becomes darker through successive frames of the video.

6. The method of claim 1, further comprising:
responsive to the detecting the third movement of the first object, in the two-dimensional plane, from the first position to the second position, rendering at least a portion of the first plurality of radial lines in the first set of radial lines to slant away from a direction of the third movement.

7. The method of claim 1, further comprising:
identifying in the video a second object that moves depicted in the video;
determining an initial size of a second set of radial lines to emanate from the of the second object, the second set of radial lines comprising a second plurality of radial lines; and
rendering, in the enhanced video, the second set of radial lines emanating from the second object using the initial size of the second set of radial lines.

8. A system, comprising:
a processor programmed to initiate executable operations comprising:
identifying in a video a first object that moves depicted in the video;
determining an initial size of a first set of radial lines to emanate from the first object, the first set of radial lines comprising a first plurality of radial lines;
rendering, in an enhanced video comprising the video, the first set of radial lines emanating from the first object using the initial size of the first set of radial lines, the enhanced video configured to be presented on at least one display;
responsive to detecting a first movement of the first object indicating a size of the first object is increasing in the video, increasing a length of each of the first plurality of radial lines in the first set of radial lines;
responsive to detecting a second movement of the first object indicating the size of the first object is decreasing in the video, decreasing the length of each of the first plurality of radial lines in the first set of radial lines; and
responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

9. The system of claim 8, the executable operations further comprising:
responsive detecting that the first object is stationary in the two-dimensional plane, rendering the first plurality of radial lines to each have a same length.

10. The system of claim 8, the executable operations further comprising:
responsive to the identifying the first object that moves that is depicted in the video, determining a metric including at least one dimension of a depiction of the first object in the video;
wherein the initial size of the first set of radial lines is determined based on the metric including the at least one dimension of the depiction of the first object in the video.

11. The system of claim 8, the executable operations further comprising:
responsive to the detecting the first movement of the first object indicating the size of the first object is increasing in the video, rendering the radial lines to include arrows pointing away from the first object; and
responsive to the detecting the second movement of the first object indicating the size of the first object is decreasing in the video, rendering the radial lines to include arrows pointing toward the first object.

12. The system of claim 8, the executable operations further comprising:
responsive to the detecting the first movement of the first object indicating the size of the first object is increasing in the video, rendering the radial lines to have a color that becomes lighter through successive frames of the video; and
responsive to the detecting the second movement of the first object indicating the size of the first object is decreasing in the video, rendering the radial lines to have a color that becomes darker through successive frames of the video.

13. The system of claim 8, the executable operations further comprising:

responsive to the detecting the third movement of the first object, in the two-dimensional plane, from the first position to the second position, rendering at least a portion of the first plurality of radial lines in the first set of radial lines to slant away from a direction of the third movement.

14. The system of claim 8, the executable operations further comprising:

identifying in the video a second object that moves depicted in the video;

determining an initial size of a second set of radial lines to emanate from the of the second object, the second set of radial lines comprising a second plurality of radial lines; and rendering, in the enhanced video, the second set of radial lines emanating from the second object using the initial size of the second set of radial lines.

15. A computer program product, comprising:

a computer readable storage medium having program code stored thereon, the program code executable by a video processing system to initiate operations including:

identifying in a video a first object that moves depicted in the video;

determining an initial size of a first set of radial lines to emanate from the first object, the first set of radial lines comprising a first plurality of radial lines;

rendering, in an enhanced video comprising the video, the first set of radial lines emanating from the first object using the initial size of the first set of radial lines, the enhanced video configured to be presented on at least one display;

responsive to detecting a first movement of the first object indicating a size of the first object is increasing in the video, increasing a length of each of the first plurality of radial lines in the first set of radial lines;

responsive to detecting a second movement of the first object indicating the size of the first object is decreasing in the video, decreasing the length of each of the first plurality of radial lines in the first set of radial lines; and responsive to detecting a third movement of the first object, in a two-dimensional plane, from a first position to a second position, decreasing the length of a first portion of the first set of radial lines emanating from a leading surface of the first object while increasing the length of a second portion of the first set of radial lines emanating from a trailing surface of the first object.

16. The computer program product of claim 15, wherein the program code is executable by the video processing system to initiate operations further comprising:

responsive detecting that the first object is stationary in the two-dimensional plane, rendering the first plurality of radial lines to each have a same length.

17. The computer program product of claim 15, wherein the program code is executable by the video processing system to initiate operations further comprising:

responsive to the identifying the first object that moves that is depicted in the video, determining a metric including at least one dimension of a depiction of the first object in the video;

wherein the initial size of the first set of radial lines is determined based on the metric including the at least one dimension of the depiction of the first object in the video.

18. The computer program product of claim 15, wherein the program code is executable by the video processing system to initiate operations further comprising:

responsive to the detecting the first movement of the first object indicating the size of the first object is increasing in the video, rendering the radial lines to include arrows pointing away from the first object; and responsive to the detecting the second movement of the first object indicating the size of the first object is decreasing in the video, rendering the radial lines to include arrows pointing toward the first object.

19. The computer program product of claim 15, wherein the program code is executable by the video processing system to initiate operations further comprising:

responsive to the detecting the first movement of the first object indicating the size of the first object is increasing in the video, rendering the radial lines to have a color that becomes lighter through successive frames of the video; and responsive to the detecting the second movement of the first object indicating the size of the first object is decreasing in the video, rendering the radial lines to have a color that becomes darker through successive frames of the video.

20. The computer program product of claim 15, wherein the program code is executable by the video processing system to initiate operations further comprising:

responsive to the detecting the third movement of the first object, in the two-dimensional plane, from the first position to the second position, rendering at least a portion of the first plurality of radial lines in the first set of radial lines to slant away from a direction of the third movement.

* * * * *